Jan. 20, 1959  L. P. BOURGOIN  2,869,634
AUTOMOBILE WINDOW SCREEN
Filed Oct. 23, 1956
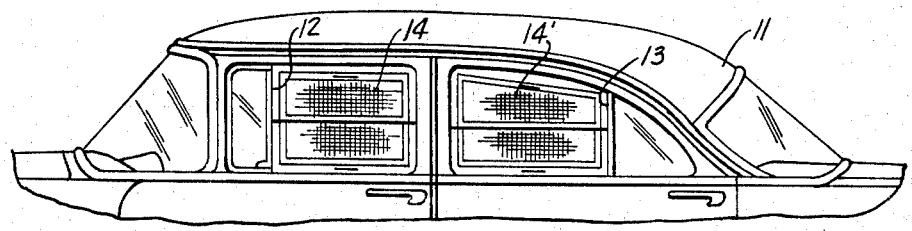
FIG. 1
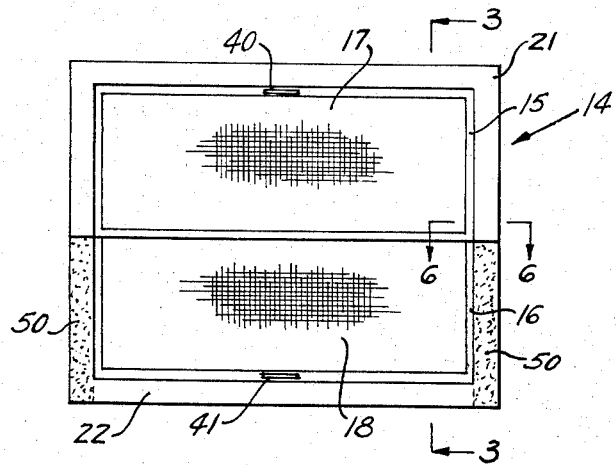
FIG. 2
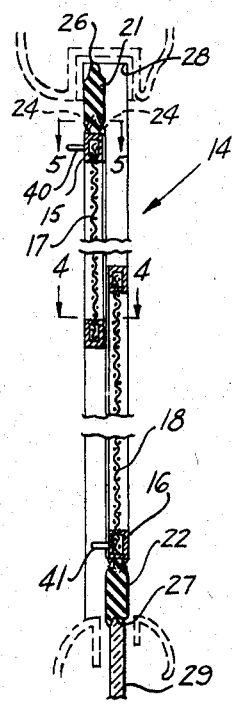
FIG. 3
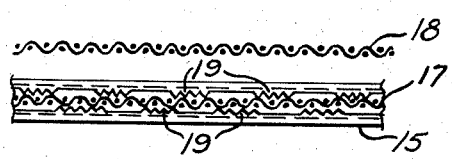
FIG. 4
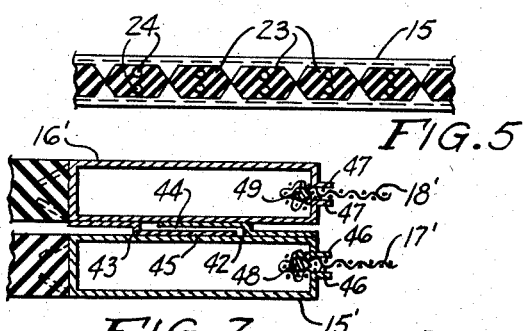
FIG. 5
FIG. 7
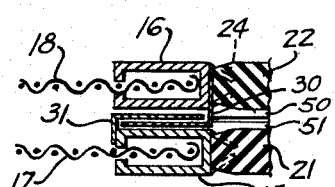
FIG. 6
INVENTOR.
LAUREO P. BOURGOIN
BY
McMorrow, Berman & Davidson
ATTORNEYS

United States Patent Office 2,869,634
Patented Jan. 20, 1959

2,869,634

AUTOMOBILE WINDOW SCREEN

Laureo P. Bourgoin, Amesbury, Mass.

Application October 23, 1956, Serial No. 617,723

1 Claim. (Cl. 160—40)

This invention relates to window screens, and more particularly to an improved window screen unit especially adaptable for use in an automobile.

The main object of the invention is to provide a novel and improved automobile window screen assembly which is simple in construction, which involves relatively inexpensive comopnents, and which is easy to install in an automobile window.

A further object of the invention is to provide an improved automobile window screen which is neat in appearance, which is readily adjustable to fit in any standard automobile window, and which is highly effective in excluding insects from an automobile while allowing free ventilation through the automobile window.

Further objects and advantages of the invention will become apparent from the following description and claim, and from the accompanying drawings, wherein:

Figure 1 is a fragmentary side elevational view of a portion of an automobile provided with improved window screen units constructed in accordance with the present invention.

Figure 2 is an enlarged side elevational view of one of the window screen units employed in the automobile of Figure 1.

Figure 3 is an enlarged fragmentary vertical cross sectional view taken on the line 3—3 of Figure 2.

Figure 4 is an enlarged fragmentary horizontal cross sectional view taken on the line 4—4 of Figure 3.

Figure 5 is an enlarged horizontal cross sectional fragmentary detail view taken on the line 5—5 of Figure 3.

Figure 6 is an enlarged horizontal cross sectional detail view taken on the line 6—6 of Figure 2.

Figure 7 is a cross sectional detail view similar to Figure 6, but illustrating a modification of the window screen structure of the present invention.

Referring to the drawings, 11 designates a conventional automobile provided with the usual side doors having window openings, shown respectively at 12 and 13. Thus, the front doors have window openings 12 which are generally rectangular in shape, and the rear doors may have window openings 13 which are trapezoidal or of other polygonal shape.

Designated respectively at 14 and 14' are window screen units according to the present invention, the units being shaped to fit in the respective window openings 12 and 13, and being of generally similar construction, except for the specific peripheral outline thereof, as is clearly apparent in Figure 1. Thus, the screen unit 14 is of generally rectangular outline and comprises a pair of frame members 15 and 16 of generally rectangular shape, each frame member being of U-shaped cross section, as shown in Figure 3, defining a continuous inwardly facing channel extending around the perimeter of the frame member, and receiving the marginal portions of respective foraminous screens 17 and 18. The edges of the respective frame members are formed with spaced groups of inturned serrations, shown at 19 in Figure 4, the serrations being in staggered opposing relationship with respect to each other, as is clearly shown in Figure 4, whereby the marginal portions of the foraminous sheets 17 and 18 are clamped between the opposing alternating groups of serrations 19, and whereby the respective foraminous panels of screen material 17 and 18 are firmly secured in the respective frames 15 and 16.

The outer portions of the frame members 15 and 16, namely, the sides of the frame members, the top portion of the frame member 15 and the bottom portion of the frame member 16, are provided with respective outwardly projecting resilient strip elements, shown at 21 and 22 suitably secured on the frame members 15 and 16. Thus, the strip elements 21 may be of rubber, or similar resilient deformable material, and may be formed with spaced integral finger members 23 disposed adjacent the edges of the frame members 15 and 16, and the frame members may be provided with respective pairs of convergent opposing prongs extending outwardly from the edges of the frame members, and shown at 24, 24 in Figure 3, the respective pairs of prongs 24, 24 being embedded in the respective finger elements 23, thus securing the strip members 21 and 22 to the outer portions of the frame members 15 and 16.

As shown in Figure 3, the top edge of the resilient strip 21 may be convexly curved, as shown at 26, and the bottom edge of the strip member 22 may be concavely curved, as shown at 27, whereby the top edge will sealingly engage in the top portion of the window channel 28 of the automobile window frame, and the bottom edge of the strip member 22 will sealingly engage on the top edge of the window pane 29 when the window pane is in the lowered position thereof shown in Figure 3.

The frame elements 15 and 16 are slidably interconnected for adjustment parallel to each other by the provision of interengaging L-shaped slide brackets 30 and 31 on the respective frames 16 and 15, as shown in Figure 6.

Thus, as shown in Figure 6, the L-shaped bracket member 30 has its relatively narrow flange secured to the outer edge of the side element of frame 16, being apertured for the passage of the prongs 24 therethrough, and has its wider flange extending parallel to the frame element 16 and spaced therefrom. Similarly, the bracket member 31 has its narrow flange secured to the inner edge of the side of frame 15 and has its wider flange extending parallel and spaced from the said side of frame 15. As is clearly shown in Figure 6, the wider flanges of the L-shaped brackets 30 and 31 interengage to retain the frames 15 and 16 in parallel relationship and to allow the frames to be adjusted vertically with respect to each other so as to properly fit into the intended automobile window opening.

As will be readily understood, the cooperating slide brackets 30, 31 are provided on the respective sides of the frames 15 and 16, so that the frames are secured in parallel adjustable relationship.

The horizontal members of the frames 15 and 16 are provided centrally thereof with respective handles 40 and 41, facilitating the mutual adjustment of the frames.

Figure 7 illustrates a modified form of the invention wherein the right side marginal portions of the cooperating frame members, shown at 15' and 16', are relatively wide, as compared to the structure illustrated in Figure 6. Secured to the inner opposing faces of the frame members are relatively flat Z-shaped interengaging slide members 42 and 43 having the offset, inwardly extending, overlapping retaining flanges 44 and 45.

The rigid frame members 15' and 16' are preferably made of sheet metal and are substantially rectangular and tubular in shape, as shown, being formed at their inner sides with respective pairs of flanges 46, 46 and 47, 47, between which the margins of the foraminous screens 17' and 18′ are clampingly received. The edges of the screens may be provided with suitable bead elements 48 and 49, to retain the screens securely in the tubular screen frames, which may comprise, for example, channel-shaped strips of sheet metal, pressed over the margins of the screens so as to be rigidly united therewith. Alternatively said bead elements may comprise heavy wire welded or otherwise rigidly secured to the margins of the screens to define the bead elements.

The flanges 46, 46 and 47, 47 may be welded together over the marginal portions of the screens 17′ and 18′ if so desired.

Strips of felt or other suitable weatherstripping material may be provided on the inwardly opposing surfaces of the strip members 21 and 22 to provide a closer seal against the penetration of insects between the screen panels, as shown at 50 and 51.

While a specific embodiment of an improved automobile window screen unit has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

In an automobile window screen unit, a pair of frame members, interengaging guide flanges secured to the inner sides of the frame members slidably interconnecting said frame members at their inner sides for adjustment parallel to each other, each frame member comprising rigid marginal elements of U shape cross section, spaced groups of inturned serrations on the inner edges of said marginal elements, said groups being in staggered opposing coplanar relationship with respect to each other, respective foraminous screen panels having their marginal portions clampingly received in said marginal U-shaped elements between said opposing groups of serrations, respective outwardly projecting resilient strip elements disposed around the outer portions of the frame members, the resilient strip element at the top of the frame members having a convexly curved edge and the resilient strip element at the bottom of the frame members having a concavely curved edge, spaced integral finger members on the strip elements disposed adjacent the edges of the frame members, and respective pairs of convergent opposed prongs on the edges of the frame members embedded in said finger members.

References Cited in the file of this patent

UNITED STATES PATENTS

| | | |
|---|---|---|
| 698,816 | Cochran | Apr. 29, 1902 |
| 1,135,352 | Bunger | Apr. 13, 1915 |
| 1,324,950 | Zrebiec | Dec. 16, 1919 |
| 1,608,785 | Evans | Nov. 30, 1926 |
| 2,549,234 | Puffer | Apr. 17, 1951 |
| 2,704,121 | Maidhoff et al. | Mar. 15, 1955 |